Patented Apr. 5, 1932

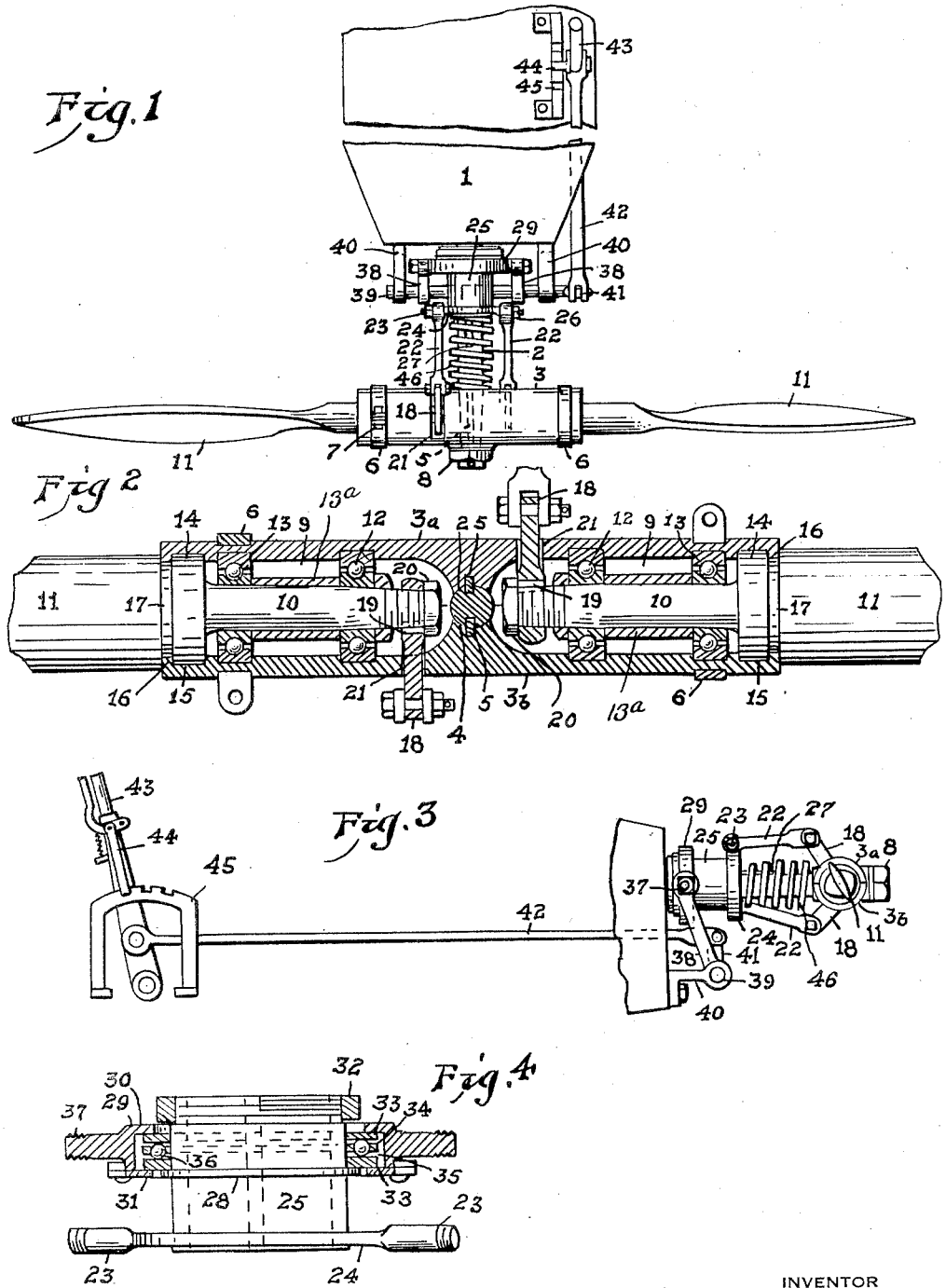

1,852,499

UNITED STATES PATENT OFFICE

JOHN RAPP ZIPAY, OF PITTSBURGH, PENNSYLVANIA

VARIABLE PITCH PROPELLER MECHANISM

Application filed April 2, 1929. Serial No. 351,917.

My invention is particularly designed and intended for use in connection with aeroplanes and the object in view is the provision of convenient and practical means whereby the operator may at will vary or adjust the pitch of the propeller blades while operating the aeroplane or other machine.

By adjusting the pitch, either before starting or while the engine is running, to a less than normal angle the engine is allowed to pick up speed and deliver its maximum power, which is necessary in taking off with a heavier load than the same aeroplane could otherwise normally carry. Upon reaching the desired altitude, the pitch may be increased by the pilot and the engine running at its most economical speed, still with the possibility of increased speed ranges should occasion demand. As the load is lightened by consumption of gasoline on a long distance flight, the pitch may be still further increased.

In landing the pitch of the screw may be changed to any degree or to the opposite direction or "reversed," just before the instant of contact with the ground, and the aeroplane brought to a stop in the very shortest space, thus entirely obviating the necessity of any prepared ground system of slowing up the aeroplane.

The aeroplane of today requires a considerable field area for rising and landing, and many designs of aeroplanes can effect a landing only at high speeds, which to a certain extent makes the operation of landing more hazardous than average flying. If convenient and practical operated variable pitch propellers were provided, the landing speeds could be reduced at least 50%.

Variable pitch propellers are also of great advantage in connection with the high altitude flying which is likely to become a feature of aerial transportation of the future. In such cases the value of the variable pitch propeller lies in the fact that the engine loses power with elevation because of the reduced ability to burn fuel. In other words, the engine at higher altitudes acts as if it were partially throttled.

A practical variable speed propeller will accomplish for aircraft substantially what change speed gears accomplish for the automobile.

My invention lies in the new and improved mounting of the propeller blades on the propeller shaft and in the means under the control of the operator for varying the pitch of the blades at will.

Other novel features of construction and also of arrangement of parts will appear from the following description.

In the accompanying drawings wherein I have illustrated a practical embodiment of the principles of my invention, Fig. 1 is a plan view showing the propeller blades and their mounting and the mechanism for varying the pitch of the blades, the fuselage of the aeroplane being broken away.

Fig. 2 is a section on enlarged scale of the partible propeller-bushing and the inner ends of the propeller blades, the plan of the section being at right angles to the plan of Fig. 1.

Fig. 3 is a broken side elevation showing the operating means by which the pitch of the propeller blades may be varied.

Fig. 4 is an enlarged detail partially in section showing the collars which are mounted on the propeller shaft.

Referring to the drawings, 1 represents the front portion of the fuselage of the aeroplane. 2 represents the propeller shaft which is driven in the usual way as by a motor, not shown, and which extends forwardly from the fuselage. On the outer end of the propeller shaft is mounted the transversely disposed propeller-bushing which is split longitudinally comprising two parts which are indicated as at 3a and 3b. At their centers each of the bushing-parts are provided with arcuate socket portions 4 which contain between them the outer tapered end of the propeller shaft 2, keys 5 fixed in seats in the propeller shaft engaging suitable slots in the bushing-parts. The bushing-parts are clamped together and on the propeller shaft by means of the clamping bands 6 which encircle the bushing adjacent to its outer ends and are tightened by means of bolts 7 which extends through the pierced ears which form the ends of the bands.

The front end of the propeller shaft is threaded to receive a clamping nut or nuts 8 to clamp the propeller-bushing fixedly on the propeller shaft.

The perimetral surfaces of the bushing-parts are preferably grooved, as shown in Fig. 2, to receive the bands 6 and prevent lateral movement of the latter. The parting between the two parts 3a and 3b is preferably increased slightly from the center towards the ends so that the bands will spring the parts together and thus more tightly and rigidly engage the bushing with the end of the propeller-shaft. The bushing is thus transversely disposed to the propeller shaft and rotates therewith.

On either side of the propeller-shaft the partible bushing is provided with a cylindrical bore 9 in which are inserted the cylindrical stems 10 which form the shanks of the propeller-blades 11. Interposed between the walls of the bushing and the stems of the propeller-blades are inner and outer antifriction devices, such as the ball bearings 12 and 13. The outer ball bearings 13 are preferably located in the plane of the clamping bands 6.

13a represents a sleeve on the stem 10 which acts as a spacer between the inner raceway members of the ball bearings 12 and 13. This sleeve may have a drive fit on the tapered stem and serves to hold the ball bearings in proper spaced relation on the stem, thus resisting longitudinal movement of the stem relative to the ball bearings.

The inner ends of the propeller-blades, adjacent to the stems 10, are provided with fixed or integral annular collars 14 which are received into annular seats or grooves 15 in the bore of the bushing. The outer ends of the bushing are provided with inturned flanges or lips 16 which work in annular grooves 17 in the propeller-blades outside of the collars 14.

It is evident that when the partible-bushing is clamped together and with the stems of the propeller-blades contained therein, endwise movement of the propeller-blades relative to the bushing is thus prevented.

The inner ends of the stems 10 are tapered to fit in the tapered bore of the collars which form the inner ends of the radially disposed pitch cranks 18, the proper position of the cranks 18 relative to the stems 10 and to each other being determined by keys 19 which engage the stems and the collar. Nuts 20 are screwed on the threaded ends of the stems to hold the cranks rigidly on the stems.

The two cranks are arranged so as to extend in opposite directions, and said cranks protrude through openings 21 in the propeller-bushing which are longitudinally extended or slotted circumferentially of the bushing, so as to give clearance for the movement of the cranks 18 transversely of the plane of the propeller-bushing.

It is apparent that by properly moving the cranks 18 the pitch of the propeller blades may be varied.

Links 22 are connected to the outer end of the pitch-cranks 18, the inner ends of said links being provided with eyes which are rotatably mounted on the trunnions 23 extending from the front flange 24 of the sleeve 25. The outer ends of the trunnions are threaded to receive the nuts 26 which hold the links on the trunnions.

The sleeve 25 is slidable on the propeller shaft 2 and is caused to rotate in unison therewith as by means of a key 27. The trunnions 23 are not diametrically opposite but are disposed in parallel planes which are tangent to a circle described from the axis of the sleeve.

The sleeve 25 is provided with an intermediate circumferentially disposed flange 28 in the rear of which a collar 29 is floatingly mounted on the sleeve so that the sleeve is free to rotate independent of the collar and the collar may be tilted relative to the axis of the sleeve without binding on the latter.

The collar assemblage is preferably as follows. The rear end of the collar is provided with an inwardly extending annular flange 30 which fits the sleeve loosely while the front end of the collar is provided with a detachable annular face plate 31 which also loosely fits the sleeve. The collar is maintained in place on the sleeve by means of an annular nut 32 which is screwed on the threaded rear end of the sleeve.

Between the collar flange 30 and the face plate 31 is contained an antifriction bearing between the sleeve and the collar, which bearing may comprise front and rear side plates 33 and between them the inner and outer raceways 34 and 35 and the antifriction elements such as the balls 36.

The side plates and the inner raceway 34 have a rotative fit on the sleeve 25, while the side plates and the outer raceway 35 loosely fit the collar 29.

At diametrically opposite points the collar is provided with radially disposed lugs 37 on to which are pivotally mounted the upper ends of a pair of levers 38 whose lower ends are fixed to a horizontally disposed rock shaft 39 which is journaled in brackets 40 extending forwardly from the fuselage.

One end, preferably the left end, of the rock shaft 39 is provided with a crank 41 whose outer end is connected by a rearwardly extending link 42 to a pivotally mounted hand lever 43 located conveniently to the hand of the operator. The hand lever 43 is provided with a spring latch 44 which works in relation to a segmental rack 45 fixed on the fuselage so that the lever may be locked in any desired angular position.

A spring 46 is wound about the propeller shaft 2 between the front end of the sleeve 25 and the propeller-bushing, thus tending to cause the sleeve to retreat rearwardly on the shaft.

It is evident that a rocking movement of the rock shaft 39 will cause the sleeve 25 to move along the propeller shaft and thus, through the links 22 cause the propeller blades to be rotated relative to the head in opposite directions, thus altering the pitch. If the shaft 39 be rocked clockwise in Fig. 3 the pitch of the propeller blades, as shown in Fig. 1, will be lessened or may be reversed, while an opposite rocking of the rock shaft will have the opposite effect on the pitch of the propeller blades.

The spring 46 may be arranged to normally retain the propeller blades in their normal flying pitch and to automatically return them thereto when the latch on the hand lever 43 is released. The pitch-cranks 18 extend through the slots 21 in such a manner that they follow the proper-bushing in its rotation, instead of being in advance thereof, the rotation of the propeller-shaft being counter-clockwise in Fig. 2. Thus these levers do not form an obstruction to the air as the propeller revolves.

The clamping bands are also so positioned, circumferentially of the propeller-bushing that the pierced ears and the clamping bolts are in the rear as the propeller rotates, thus avoiding obstruction to the air.

It is evident from the foregoing that my invention provides a convenient and practical means for varying the pitch of aeroplane and other propellers by the operator while the aeroplane or other machine is in full operation.

What I desire to claim is:—

In a variable pitch propeller construction, a blade hub consisting of a longitudinally divided bushing forming a blade hub and consisting of complementary halves, said bushing having a blade shank receiving recess in each end, the recess in each end having a pair of spaced grooves extending therearound, the outer groove being spaced from the outer end of the recess and the inner groove being spaced from the inner end of the recess, anti-friction bearings having inner and outer races held in said recess with the outer races seated in the respective grooves, a propeller blade for each end of the bushing having a shank entering the recess and fitting in the inner races of the bearings therein, the recess in each end having a third groove therein between the outer bearing groove and the mouth of the recess, a collar formed on said shank fitting in the third recess to prevent longitudinal movement of the shank in the recess, the inner end of each shank being tapered and threaded, an adjusting nut secured on said inner end and bearing against the inner race of the inner bearing, a rock arm for each shank having a hub fitted on the tapered end and keyed thereto, and a nut on the extremity of the shank holding said hub in place.

Signed at Pittsburgh, Pa., this 29th day of March, 1929.

JOHN RAPP ZIPAY.